United States Patent [19]

Cecil et al.

[11] 4,010,346
[45] Mar. 1, 1977

[54] SELF-PROPELLED TRACTOR FOR WELDING AND CUTTING APPARATUS AND THE LIKE

[75] Inventors: Shelby Cecil, Medina; Donald Geringer, Parma, both of Ohio

[73] Assignee: Cecil Equipment Co., Inc., Medina, Ohio

[22] Filed: Apr. 14, 1975

[21] Appl. No.: 567,866

[52] U.S. Cl. .............................. 219/125 PL; 228/9; 318/575
[51] Int. Cl.² .......................................... B23K 9/00
[58] Field of Search ................. 219/125 R, 125 PL; 228/8, 9, 25, 27, 32; 318/575, 578, 587; 33/23 K

[56] References Cited
UNITED STATES PATENTS

| | | | |
|---|---|---|---|
| 2,847,558 | 8/1958 | Mosny | 219/125 R |
| 3,171,012 | 2/1965 | Morehead | 219/125 PL |
| 3,230,341 | 1/1966 | Blackburn | 219/125 R |
| 3,452,180 | 6/1969 | Bollinger et al. | 219/125 R |
| 3,596,048 | 7/1971 | Maeda et al. | 219/125 PL |
| 3,883,956 | 5/1975 | Zeewy et al. | 33/23 K |

*Primary Examiner*—J. V. Truhe
*Assistant Examiner*—Clifford C. Shaw
*Attorney, Agent, or Firm*—Cain and Henn

[57] ABSTRACT

A propelled tractor, for welding or cutting apparatus and the like.

The tractor has drive and steering wheels and is adapted to support necessary welding or cutting equipment including a guidance system. The guidance system includes a probe mounted on a slide and adapted to follow a seam, template work path or the like and to respond to denotions therein in proportion to the amount of the deviation. The drive and steering wheels are driven by separate motors. The drive motor is adjustable to a predetermined speed so that a wide range of welding or cutting rates are provided and means is provided to selectively disconnect the drive train so that the tractor may be free wheeled. The steering motor is controlled in response to the probe and steers the tractor to return the probe to a predetermined null position, the turning rate being proportional to the magnitude of the deviation sensed by the probe. The probe also controls the working head, welding head or cutting torch to position it on the work path, welding seam or cut line, respectively.

The apparatus may be advanced automatically or manually and, if automatic, preferably is adapted to advance, when used for welding only when welding current is drawn.

The apparatus includes structure so that the tractor is positioned via the sensing means to retain any desired space, straddle, etc., position relative to the work path.

24 Claims, 10 Drawing Figures

SELF-PROPELLED TRACTOR FOR WELDING AND CUTTING APPARATUS AND THE LIKE

BACKGROUND OF THE INVENTION

1. Field of The Invention

This invention relates to welding or cutting apparatus and, more particularly, to such apparatus which is self-propelled, free moving, i.e., not mounted on tracks, and includes sensing means for automatically positioning the working head (welding or cutting), the sensing means itself and the tractor.

2. Description of The Prior Art

There has long been a need in the metal working art for a self-propelled welding or cutting apparatus which was free moving, as opposed to track mounted, and self-steering in response to the demand of the work being done and capable of positioning and maintaining its working head in operative relationship with the work path (and piece) even when the deviations in the work path exceed the range otherwise provided by the welding or cutting apparatus and which would respond to the deviation in the work path to correct therefor in proportion to the magnitude thereof.

SUMMARY OF INVENTION

It is, therefore, a general object of this invention to provide a new and improved automatic, self-propelled, structurally independent, non-track mounted carriage or tractor structure for supporting a working head mounted on a cross-slide or similar structure for welding, cutting, or the like, wherein the apparatus follows, and maintains the working head in the desired position relative to, the work path, and maintains the tractor or carriage in a predetermined position relative to the work path and so does even though the deviations in the work path exceed the normal range of the cross-slide or similar structure.

Another object of this invention is to provide a new and improved automatic, self-propelled, structurally independent, non-track mounted carriage or tractor structure for supporting a working head mounted on a cross-slide or similar structure for welding, cutting, or the like, including a sensing or guidance means for controlling the working head, the tractor and itself, which includes a sensing or guidance means for controlling the working head to maintain a functional relationship with the work path, even though and as the same deviates from the normal direction, even though such deviations are irregular, are in opposite directions, and even though such deviations include intervening straight or curved segments out of line with the normal direction of the work path previously being followed, during the welding or cutting operation; which includes sensing or guidance means which maintains itself in contact with a guide, be the guide the work path, or a separate template, wall or other means; which includes sensing or guidance means and structure which maintains the tractor in a predetermined position, such as straddling or offset, relative to, the work path; which is rugged of construction which is efficient and effective in use and operation; which is relatively economical to manufacture and use; which has a wide range of applications and uses; which is simple and fool-proof in operation; which may be adapted to weld or cut (operate functionally on) horizontal or vertical work paths (seams or cut lines) as well as paths, seams or cut lines which are, in effect, a vector sum of both horizontal and vertical components; which includes means whereby the sensing means responds to deviations in the work path or guide means to steer the tractor and thereby maintain the tractor in a predetermined relationship relative to the work path to keep the sensing means in its normal or at rest position and which includes such last means whereby the corrections for deviations in the work path, including turning angle of the tractor, are proportional to the magnitude of the deviations respectively; which includes means whereby the tractor movement compensates for work path deviation so that the apparatus follows deviations which exceed the range of the cross-slide assembly which tractor movement means may be operated manually at the discretion of the operator; which includes means whereby the working head and/or the tractor, including the steering thereof, may be operated manually or automatically independently of each other, which will proceed, advance or travel automatically when the welding or cutting operation in initiated and welding parameters are established and will stop if they are lost or cease; which includes at least one motor responsive drive wheel which is controlled, in the first instance, by welding current, or other work parameter; which includes one or more motor driven drive wheels which are both controlled as to go or no go by welding current, or other work parameter and driven at selectively adjustable, predetermined speeds; which will advance or travel at a selectively adjustable predetermined speed; which includes guidance or sensing means for automatically seeking out and finding the seam or joint to be welded; which is portable; which includes a carriage capable of being driven forwardly on a selective basis; and which responds to the guide means (work path or template) to travel in a predetermined spaced relation with the work path, seam or cut line being worked.

Still another object of this invention is to provide a welding or cutting tractor or carriage and the like obtaining one or more of the objects and advantages hereinbefore set forth.

These and other objects and advantages of this invention will appear from the following description of preferred forms thereof, reference being made to the accompanying drawings.

DESCRIPTION OF THE PREFERRED EMBODIMENTS

Figure 1:
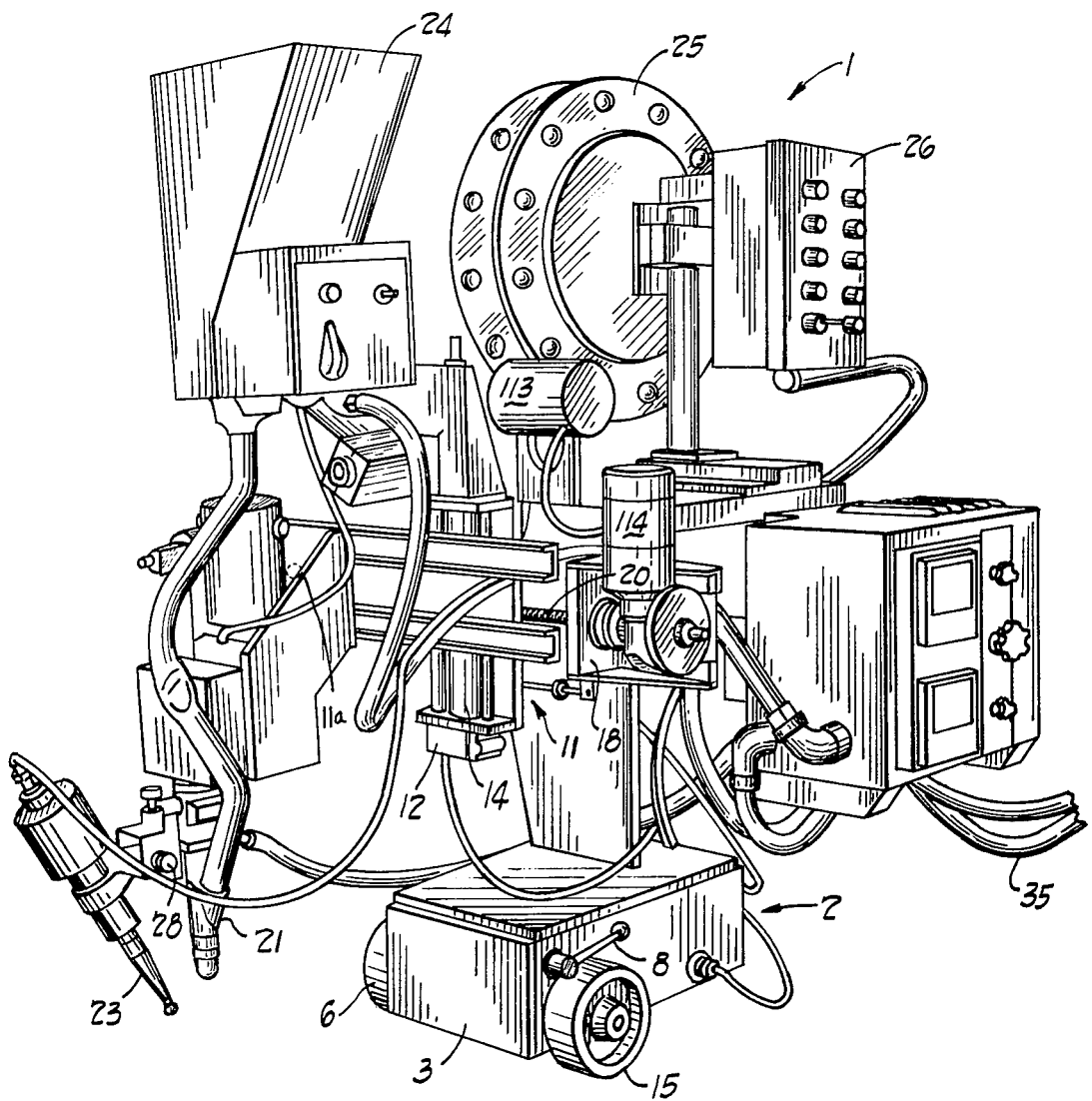
FIG. 1 is a perspective view of an apparatus embodying a preferred form of this invention.
Figure 2:
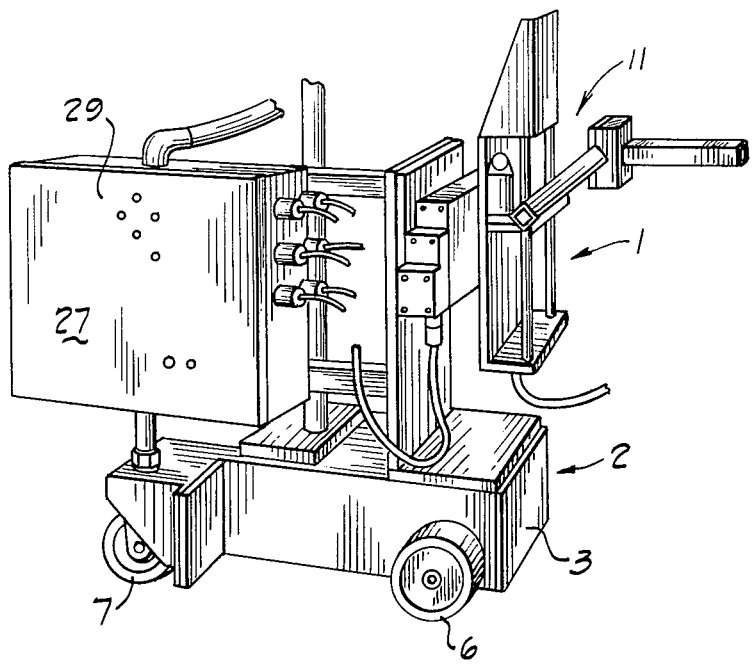
FIG. 2 is a side view of the apparatus shown in FIG. 1 with different welding apparatus thereon, showing the steering wheel.

An apparatus embodying a preferred form of this invention is indicated generally at 1, FIG. 1 and includes the tractor or carriage 2 having a base housing 3 supported on wheels 5 and 6, at least one of which is driven, and steering wheel 7 (FIG. 2).

Figure 5A:
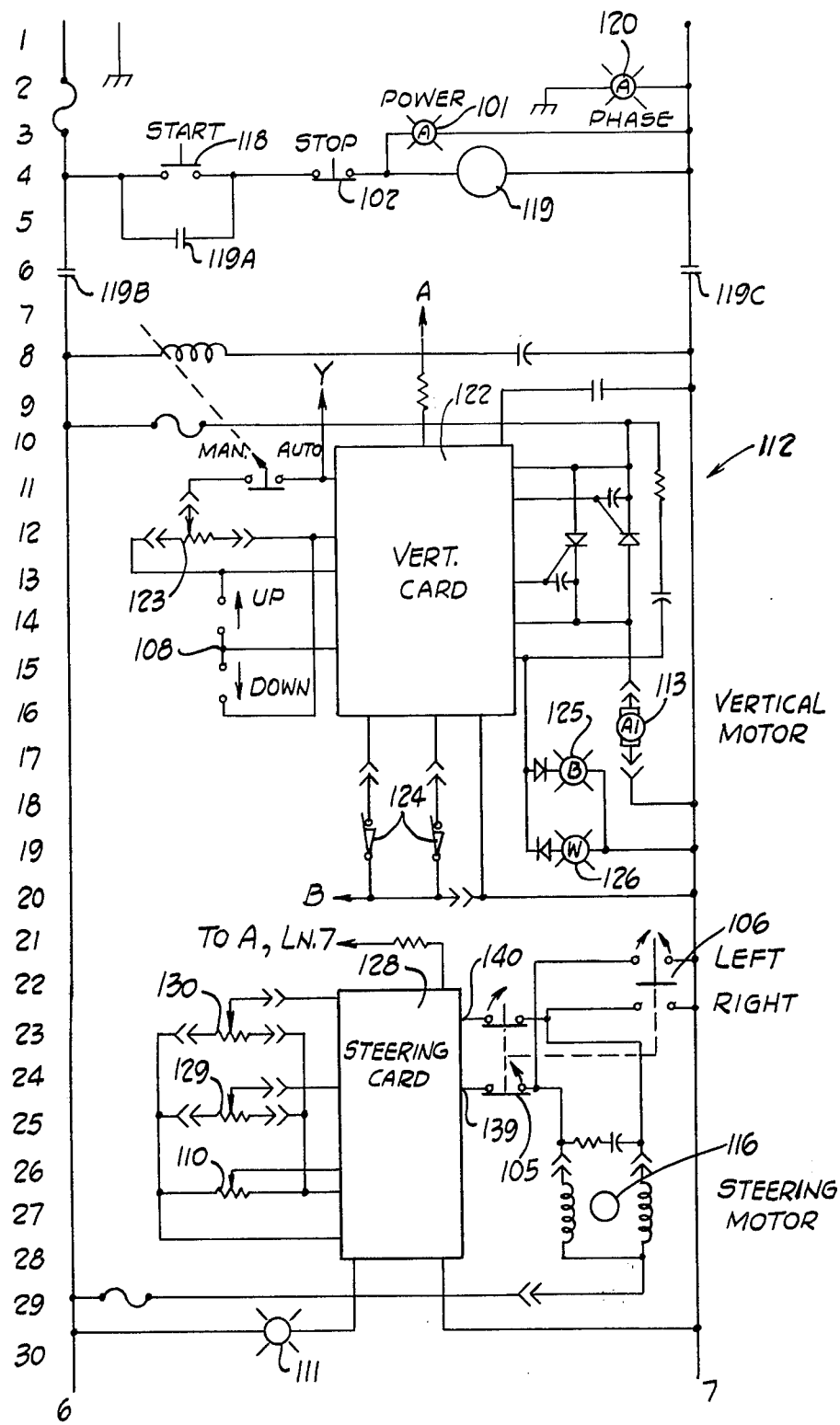
FIG. 5A, B and C is a schematic diagram of the electrical system for the apparatus shown in FIG. 1 with FIG. 5B being a continuation of FIG. 5A and FIG. 5C being a continuation of FIG. 5B.

The driven wheel is driven by a variable speed electric motor 116, FIG. 5A, carried within the housing 3, through a conventional gear train which may be disconnected selectively at the discretion of the operator by means of the handle 8.

Mounted on the housing 3 is suitable apparatus necessary to carry out the desired function, welding, cutting, etc., which, per se, form no part of this invention.

Also mounted on the housing 3 is a suitable cross-slide assembly indicated generally at 11, as shown for example in U.S. patent application Ser. No. 318,493 filed Dec. 26, 1972, now U.S. Pat. No. 3,883,956.

The assembly 11 includes a vertical component, member, structure or slide assembly 12 which is supported, directly or indirectly, on the base or housing 3 of the tractor 1 and includes a worm or screw drive 14 and moter 113. A horizontal component, member, structure or slide assembly 18 is supported on screw drive 14 and in turn includes a screw drive 20 and motor 114.

The working tool, welding torch 21, cutting torch, etc., is supported on the horizontal cross slide, as is the sensing mechanism or probe 23.

As shown in FIG. 1, the probe 23, which is of the type shown and described in the aforementioned U.S. patent application Ser. No. 318,493 filed Dec. 26, 1972 is also mounted on the horizontal slide assembly 18 and, in this instance, is positioned just forward, relative to direction of travel of the tractor during welding, of the welding torch.

Probe 23 is adapted to seek out and maintain itself and the tool, welding torch or the like, in contact with the seam or joint to be welded, as shown in the aforesaid U.S. patent application Ser. No. 318,493 filed Dec. 26, 1972 and described further below.

Alternatively, as will be shown below, the probe may be displaced laterally relative to the work tool (torch) and the work path (seam or cutting line) and follow on a template or other guide means with which the work path is to be parallel.

The apparatus, as shown, also includes a recepticle 24 for flux and a spool or reel 25 for welding wire, the nature of which depends on the particular operation being carried out. The tractor also includes a control panel 26 and a circuit box 27 (FIG. 2) with indicator light panel 29 thereon (also FIG. 3), all as described more fully below. The indicator light panel 29 includes a fuse 30 for the protection of the control circuits.

The steering wheel 7 (FIG. 2), is preferably and conveniently of the castor type, and is conveniently located to one side of the tractor so that operator may, if desired, position the tractor to straddle the work path as it advances, without having the steering wheel run into or on the seam or cut line (work path).

The steering wheel 7 is driven by a reversible electric motor 116, FIG. 5A, which can be fixed as shown or variable speed at the discretion of the user. Motor 116 is responsive to the direction and magnitude of displacement of the probe 23 to turn the steering wheel 7 and tractor 2 to steer the tractor to compensate for any deviation the probe senses in the guide path (work path or template). Further, as will appear more fully below, the response is proportional to the magnitude of the deviations. Thus the motor 116 causes the wheel 7 to turn at a greater or sharper angle if the deviation of the path is greater than it would for a little deviation, the angle being proportional, as noted, to the deviation.

The tractor 2 can, in fact, track a circle or any other pattern of work path which is a combination of straight and/or curved segments.

Further, whereas the slide assembly 11 would normally have a central or neutral position, with respect to both the vertical 12 and horizontal 18 assemblies, and would sense deviations both up and down and left or right of a straight, level forward line (work path, seam or cut line), the apparatus of this invention also includes means, as will appear more fully below, whereby the at rest position of probe 23 on the horizontal slide assembly 18 may be positioned to either side of center a predetermined amount, so as to permit the tractor 2 to track to the side or edge of the work path, instead of straddling it, if desired. This might be desired, for example, if an obstacle to the tractor 2 were immediatedly adjacent the work path or if the work path were a seam for welding a vertical plate to a horizontal plate.

Whether the at rest position is chosen at the usual center of the horizontal cross-slide 18 or a predetermined offset therefrom, this position functions as a null position, to and for the purposes noted herein and as more fully described below, so that when the probe 23 responds to deviations in the work path, template or guide, the tractor 2 is actuated by that response to position itself correspondingly to compensate for and return the probe 23 to the null position as chosen by and at the discretion of the operator.

This structure, since it causes the tractor 2 to respond to position itself so that the probe 23 is maintained or at least biased and displaced toward the null position, provides means whereby the apparatus 1 as a whole may track and follow deviations which are greater in magnitude and range than the range or distance otherwise provided by the travel made possible by the cross slide 18, i.e., screw thread. Note, that, as a consequence, as noted above, the tractor 2 can even follow a work path which is circular.

The tractor 2 is connected by suitable electrical leads, 35 to a power source, not shown, and to hoses for gas and water, as needed, which leads and hoses, if provided, are of sufficient length to permit the ulimate desired travel of the tractor 2. Similarly, if necessary, other leads, hoses and the like may interconnect the tractor 2 with supply sources, it only being necessary that such connections provide or permit the necessary tractor travel.

Figure 4:
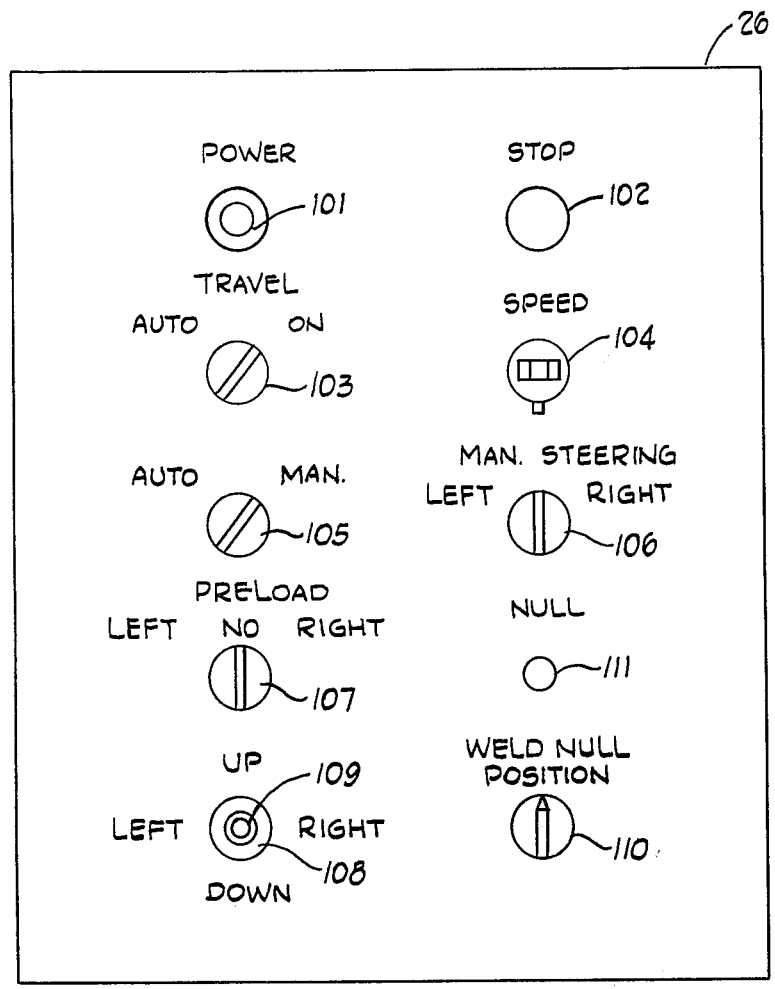
FIG. 4 is an elevational view of the operator's control panel shown in FIG. 1.

FIG. 4 shows the control panel 26 for the operation of the system. An illuminated indicator 101 signifies that power is being applied to the control system when lit. The panel 26 also has a stop control 102 which, when activated removes power from the control system only, i.e., the power to the welder itself is not terminated.

A two position travel switch 103 controls the movement of the tractor 2. In one position, i.e., ON, the travel switch 103 causes the tractor 2 to move forward at a preselected speed. When welding is not being done, the movement of the tractor may be stopped by moving the travel switch 103 to a second position, i.e., AUTO. However, if the welding is initiated while the travel switch 103 is positioned at AUTO, the tractor will continue to move forward at a preselected speed regardless of subsequent positioning of the switch 103.

Directly to the right of the travel switch 103 is a speed control 104. The control 104 comprises a potentiometer, the position of which determines the speed at which the tractor 2 travels. In this regard, clockwise rotation of the control 104 increases the speed of travel and, conversely, counter-clockwise rotation decreases the speed.

Below the travel switch 103 is a two position mode switch 105. With the mode switch 105 in the Automatic position, the probe controls cross slide positioning. When the mode switch 105 is in the Manual position, control of the cross slide position is entirely dependent upon operation of joy stick 108, as described below.

Immediately to the right of the mode switch 105 is a manual steering switch 106. This switch has two positions which result in movement of the tractor 2 in either the left or right direction depending on the corresponding movement of the switch 106 to either the left position or right position, respectively. The switch 106 is spring biased to the center position so that movement will occur only as long as the switch is held in either the left or right position.

Figure 5B:
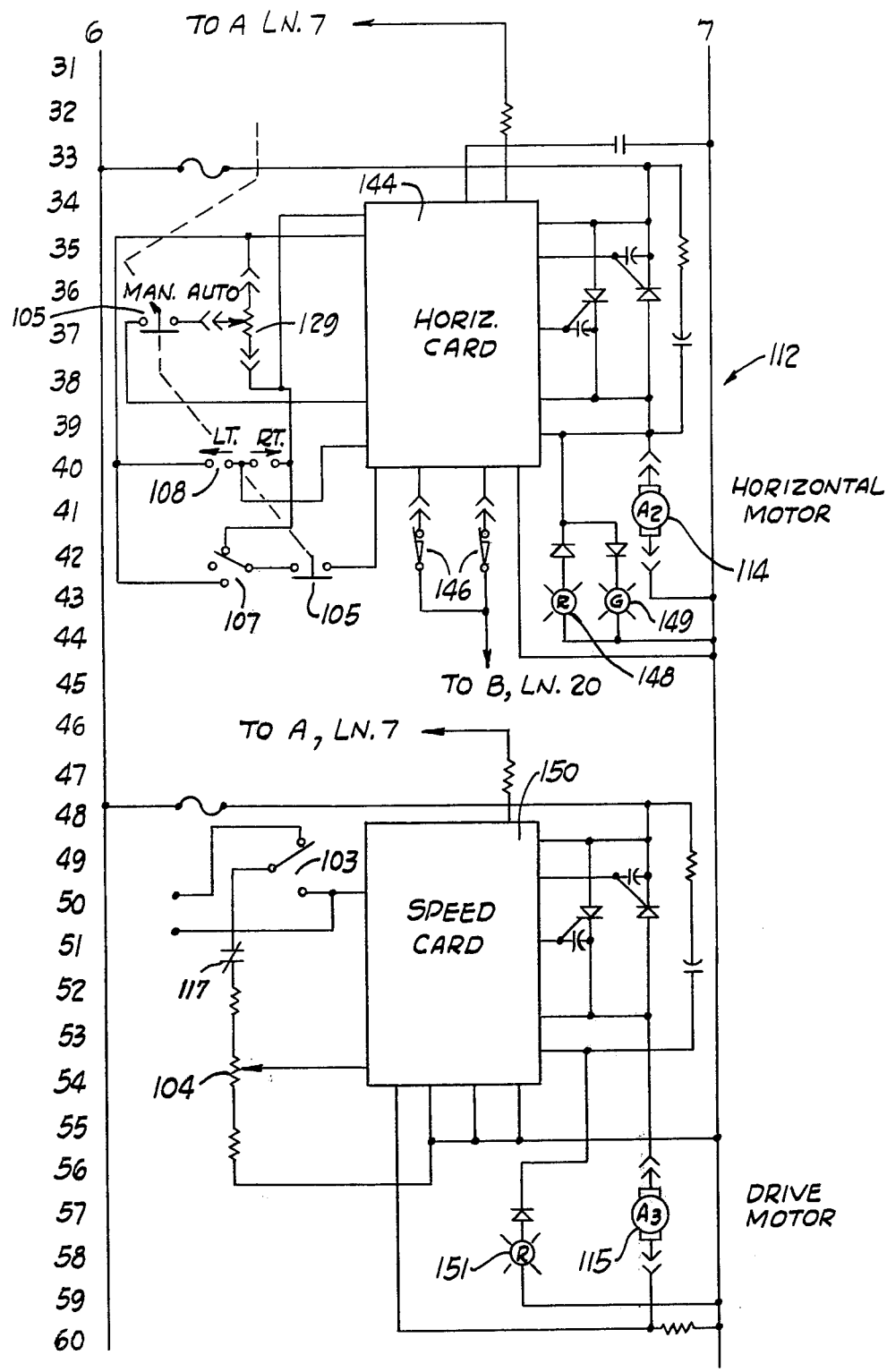

Immediately below the mode switch 105 is a preload switch 107. The purpose of the preload switch 107 is to bias the movement of the cross-slide 18 so that it is either left or right searching. To this end, when the mode switch 105 is in the Auto position, the cross-slide 18 will cause the probe 23 to move to the right, when the preload switch 107 is positioned to the right, until the probe 23 discovers a seam to be followed (or until a protective limit switch 146, FIG. 5B, is activated). Likewise, with the mode switch 105 at Auto and the preload switch 107 at the left position, the cross-slide 18 will cause the probe 23 to proceed to the left until a seam is discovered (or protective limit switch 146 activated).

Directly below the preload switch 107 is a joystick 108. The joystick 108 is basically a four position switch, i.e., up, down, left and right. The movement of the joystick 108 results in corresponding movements of the cross-slides 12 and 18 and thus the probe 23. Since the basic principle of this invention is for the tractor 2 to correct its movement to match the movement of the probe 23, movement of the joystick 108 effectively results providing in steering command signals to the tractor 2. As noted above, the movements caused by the joystick 108 are dependent upon the mode switch 105 being positioned at manual. The joystick 108 has a mechanical lock 109 at the extreme end thereof which must be depressed in order to move the joystick 108.

To the immediate right of the joystick 108 is a weldnull control 110 and immediately above the control 110 is a null lamp 111. The weld-null control 110 is utilized to select a null position. The cross slide is positioned to a desired working reference or null position by any convenient means. The weld-null control 110, which is a potentiometer, is then rotated until the null lamp 111 illuminates. At this point, the circuits are arranged so that welding may proceed and the seam will be followed in such manner that the deviations of the probe from the null position are minimized.

The basic operation of this invention is the same as in the U.S. patent application Ser. No. 874,153 filed Nov. 5, 1969 cited above, with the exception of additional components. In this case, the cross slide 18 has been provided with a potentiometer 129, FIG. 5A, which is utilized to indicate the precise position of the cross slide 18 and thus the probe 23. Also, a potentiometer 130 is provided on the steering wheel 7 of the tractor 2 to indicate movement thereof. Any movement of the cross slide 18, representing corresponding movement of the probe 23, is detected by the potentiometer 129 and results in a corresponding corrective movement of the tractor 2 by means of signals steering the tractor.

Figure 5C:
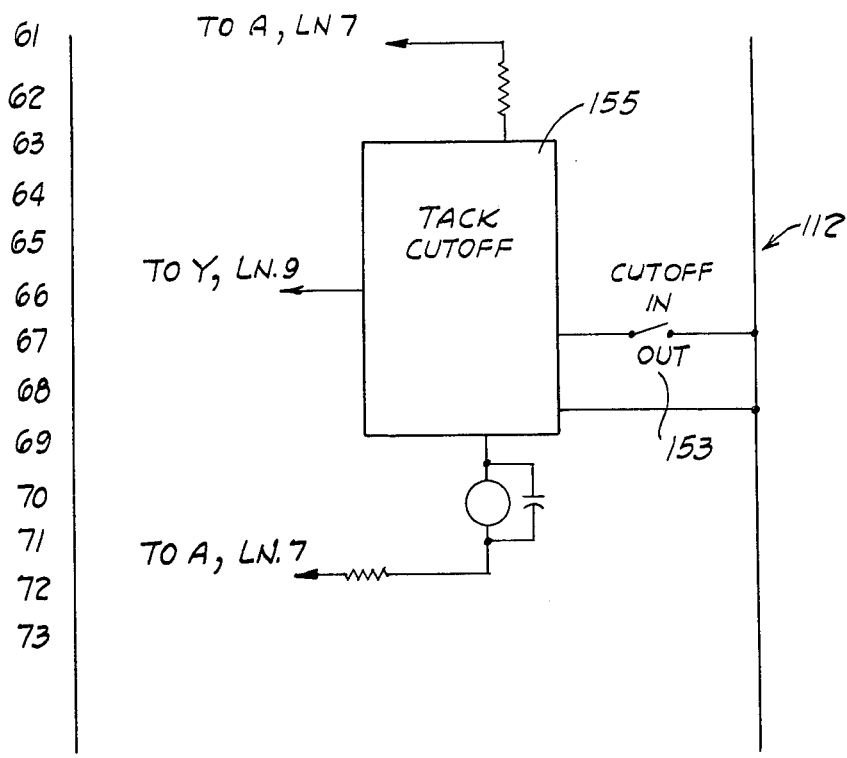

The corrective movement of the tractor is a product of electrical signals produced as a result of the circuits indicated generally at 112 depicted by the continuing electrical schematic of FIGS. 5A, 5B and 5C. The overall purpose is to control and operate the vertical 113 and horizontal 114 cross slide motors, main drive motor 115 for the tractor 2 and a steering motor 116 for the tractor.

The control circuits are initially activated by means of a start switch 118 which energizes a main control relay 119. The main control relay 119, in turn, closes contacts 119a, which latches the power on by avoiding switch 118, and completes the remainder of the circuits through contacts 119B and 119C. The main control relay 119 also energizes the power indicator 101 as noted above. The phase indicator 120, which is located on panel 29 of the main control box 27, indicates that the circuit 112 is properly connected to the power lines when not lit and, conversely, improperly connected when lit. The stop control 102, as described above, may be utilized to discontinue operation of the circuit 112 at any time by causing de-energization of the main control relay 119.

The first control function of the circuit 112 is that of the vertical motor 113 for the vertical slide 12. For this purpose, vertical card circuit 122 is provided. The details of vertical card circuit 122 are as described in U.S. application Ser. No. 318,493 filed Dec. 26, 1972. Very basically, a signal is sensed from the probe 23 and this signal is utilized by the circuit 122 to effect operation of the vertical cross-slide motor 113 to correct for, or trace, out the movement of the probe 23. In this case, the inputs to the vertical card circuit 122 include a probe vertical potentiometer 123, the mode switch 105 described above and the vertical portion of the joystick 108, described above. Also, vertical limit switches 124 located at either extreme of the vertical cross-slide 12 effect the control of the vertical card circuit 122.

The output of the vertical card circuit 122 comprises signals controlling movement of the vertical motor 113. In addition, a blue indicator 125 and a white indicator 126 are operated by the vertical card circuit 122 to indicate, respectively, downward and upward signals to the vertical cross-slide 12. The indicators 125 and 126 are located on the main control panel 27 as noted above.

The next control function of the circuit 112 is that of the steering motor 116 for the steering wheel 7 on the tractor 2. For this purpose, a steering card circuit 128 is provided. This circuit 128 has as inputs the horizontal cross-slide potentiometer 129, the steering potentiometer 130, indicating the movement of the steering wheel 7, and the weld-null potentiometer 110 noted above.

The output of the steering card circuit 128 is the control of the motor 116. However, intermediate the circuit 128 and the motor 116 is the manual steering switch 106. As noted above, when the mode switch 105 is in the Auto position, the circuit 128 controls the movement of the steering motor 116. When the mode switch 105 is in the Manual position, the circuit 128 is overriden and the manual steering switch 106 controls movement of the motor 116 and thus steering of the tractor 2. As noted above, the degree of deviation of the tractor 2 from the movement of the probe 23 proportionally controls and effects the degree of correction provided to the motor 116.

Figure 6:
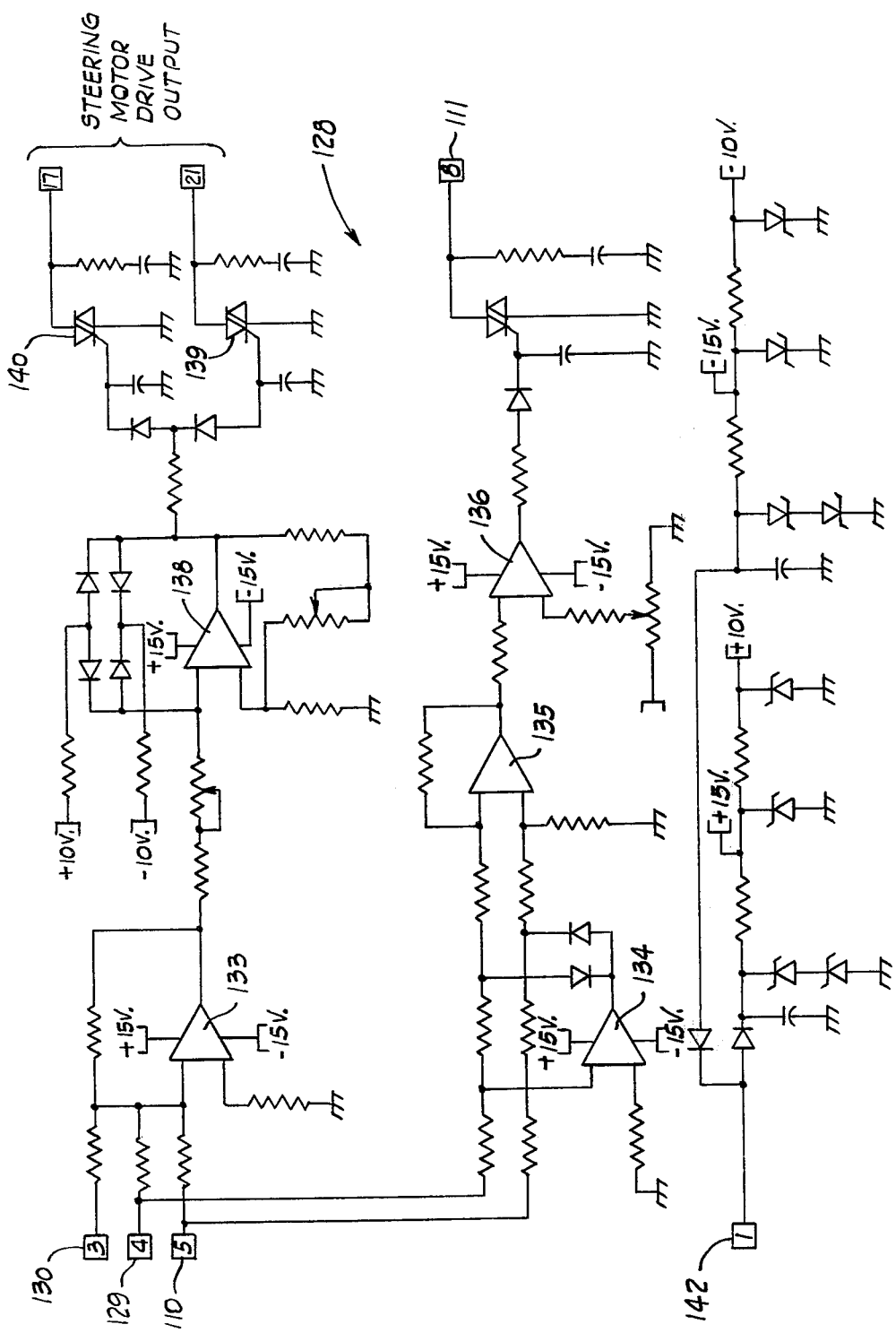
FIG. 6 is a schematic diagram, on an enlarged scale, showing the tractor steering motor card of FIG. 5A.

The details of design of the steering card circuit 128 are shown with the aid of FIG. 6. An operational amplifier 133 with appropriate biasing sums the signals from the steering potentiometer 130, the horizontal cross-slide potentiometer 129, and the weld-null potentiometer 110.

The signals from the horizontal cross-slide potentiometer 129 and the weld-null potentiometer 110 are further summed by means of another operational amplifier 134. The desire at this point is to indicate whether the voltage at the horizontal cross-slide potentiometer 129 is, or is not, equal to the voltage at the weld-null potentiometer 110. When these two voltages are summed through the amplifier 134, the result may be either positive, negative or zero. The concern being only whether the value is zero or not, the output of amplifier 134 is full wave rectified through the use of an operational amplifier 135.

The output of operational amplifier 135 is, in turn, subjected to a threshold detector 136, i.e., an operational amplified with appropriate circuitry. The purpose of the threshold detector 136 is to provide a range, established by the setting of a width potentiometer 137, for acceptance of the output signal from amplifier 135. To this effect, if the values of the voltages at the slide potentiometer 129 and weld-null potentiometer 110 are identical or close, but not exactly identical, the threshold detector 136 will produce a signal which is positive and visually identifiable by means of illuminating the null lamp 111. If the output of the detector 136 is negative the result is no illumination of the lamp 111.

Since the object at this point, as more fully described above, is to set the weld-null potentiometer 110 so that the lamp 111 does illuminate, the potentiometer 110 is adjusted accordingly. With the slide potentiometer 129 and weld-null potentiometer 110 summing to zero, the steering potentiometer 130 generates a self-cancelling voltage signal being directed to the steering motor 116 so that a straight line is followed. The correction by the steering potentiometer 130 occurs as a result of the output from summing amplifier 133 being directed to window detector 138, i.e., operational amplifier with appropriate circuitry. The output of this window detector 138 is positive, negative or zero and results in conduction of either a left triac 139, right triac 140 or no triac conducting, correspondingly. The conduction of left 139 or right 140 triacs, results in corresponding left or right steering of the tractor 2 through operation of the steering motor 116.

In the event that the horizontal cross-slide 18 moves in following a weld, the cross-slide potentiometer 129 changes position and the steering potentiometer 130 is required to move, and thus correct the position of the tractor 2 and cross-slide 18, in order for the summing amplifier 133 to balance. Thus, the null position initially set by the weld-null potentiometer 110 is ultimately searched for and maintained.

The remainder of FIG. 6 comprises power supplies necessary for the operation of the operational amplifiers and potentiometers. Thus a source 142 provides a basic voltage which is manipulated as necessary to provide needed voltage levels and polarities.

Returning to FIGS. 5A, 5B and 5C, the next section concerns the operation of the horizontal cross-slide motor 114. For this purpose there is a horizontal card circuit 144 which serves to control operation of the motor 114. As in the case of the vertical card circuit 122 above, the horizontal circuit 144 operation is as described in U.S. patent application Ser. No. 318,493 filed Dec. 26, 1972.

The inputs to the horizontal card circuit 144 include connections from the mode switch 105, the horizontal directions of the joystick 108, the preload switch 107. A set of horizontal limit switches 146, located at either extreme of the horizontal cross-slide 18, also effect control of the horizontal card circuit 144.

Figure 3:
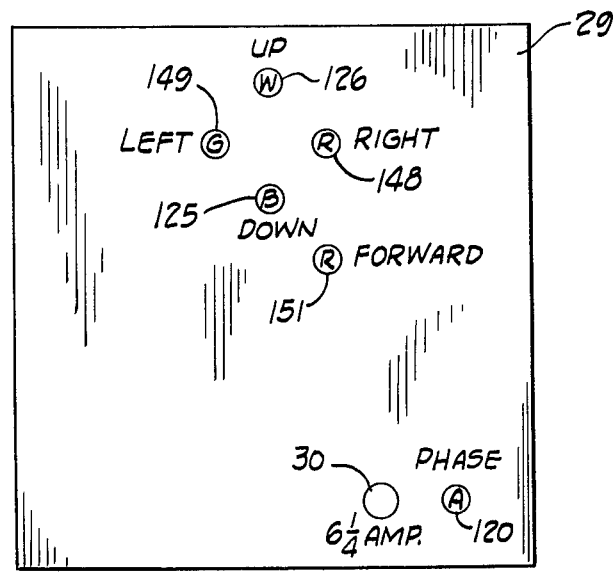
FIG. 3 is an elevational view of the indicator panel shown in FIG. 2.

The output of horizontal card circuit 144 comprises signals controlling movements of the horizontal motor 114. In addition, a red indicator 148 and a green indicator 149, FIG. 3, are operated by the horizontal card circuit 144 to indicate, respectively, right and left movement of the horizontal cross-slide 18. The indicators 148 and 149 are located on the indicator light panel 29 of the control panel.

The next control function of the circuit 112 is the forward speed of the tractor 2. In this respect, a speed card circuit 150 is provided which utilizes various input signals to produce a proportional electrical signal to operate the drive motor 115. The inputs to the speed card circuit include connections from the travel switch 103 and the speed control potentiometer 104. The operation of these components is explained above. In addition, the speed of the tractor 2 is effected, in fact halted, in the event that the welding current falls below a predetermined level or the welding apparatus 1 becomes disconnected or otherwise loses power or other necessary functions for the welding operation. The control of the speed card 150 for these purposes is obtained through a relay contact 117. The relay contact 117 and corresponding relay is controlled by conventional circuitry sensing the presence of current in the welding circuit and comparing to the predetermined level necessary for acceptable welding.

The output of the speed circuit 150 comprises signals to control the drive motor 115. In addition, a red indicator 151, FIG. 3, is operated by the speed circuit 150 and is illuminated when the tractor 2 is proceeding in a forward direction.

The last section of the circuit 112 is a control for automatically removing and returning control over movement of the tractor 2 from and to the probe 23 and its corresponding circuits. In the event that the seam to be welded has already been tack welded, i.e., spotted along its length to maintain position, it may not be desirable to allow automatic tracking by the probe 23 over the tack welds. It may easily be understood that when the probe 23 detects the tack weld, it will appear as an interference in the path and therefore correction will be attempted. The result is a movement of the welding torch at a position other than where required, since the probe 23 generally leads the torch 21.

For this reason, a cut off switch 153 is provided, which when manually preset, activates a tack cut off circuit 155 upon the detection of a tack weld by the probe 23. The tack cut off circuit 155 operates primarily as a delay circuit. Immediately upon the detection of a tack weld by the probe 23, the circuit 155 removes control of the vertical motor 113 and horizontal motor 114, from the remainder of the circuit 112. This noncorrective, operation continues until the probe 23 detects that the tack weld has passed the probe 23.

The tack cut off circuit 155 becomes particularly important where the parameters of the weld being made must be maintained within any close tolerance. In such a case, allowing the torch 21 to move instantaneously when the probe 23 detects a tack weld might well upset the parameters enough to fall outside the allowable tolerances.

Figure 7:
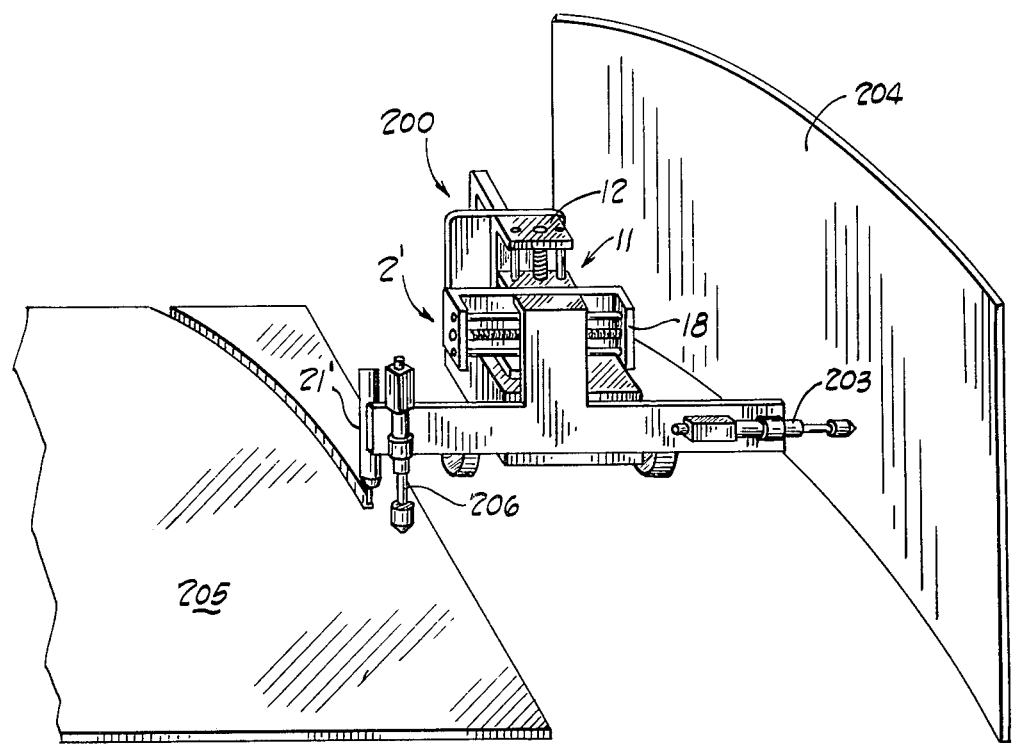
FIG. 7 is a partly schematic, elevational view of another preferred form of apparatus embodying this invention; and, FIG. 8 is a perspective view, partly schematic, of still another apparatus embodying a preferred form of this invention.

FIG. 7, discloses another apparatus, indicated generally at 200, embodying a preferred form of this invention. In this instance, the tractor 2' includes the same drive and steering mechanism as the tractor 2 with or without, as shown, the clutch (shiftable gear) mechanism operable by handle 8, and cross-slide assembly 11, including the vertical 12 and horizontal 18 assemblies, respectively.

In this instance, however, a single axis probe 203 is disposed to follow a vertical template 204 or guide and the working head, cutting torch 2' in this instance, tracks along a horizontal plate 205 with the aid of another single axis probe 206. Further, as shown, the single axis probe 203 is disposed with its axis horizontal and the single axis probe 206 is carried on the horizontal cross-slide 18, so that the working head is maintained at the correct height relative to the work path.

In this instance the tractor 2' is steered in response to the probe 203 in the manner aforesaid, but the entire apparatus is adapted to sense and respond to two guides or guide surfaces, in order to properly locate the working head (tool) relative to work path and the work piece within which the path is located.

Figure 8:
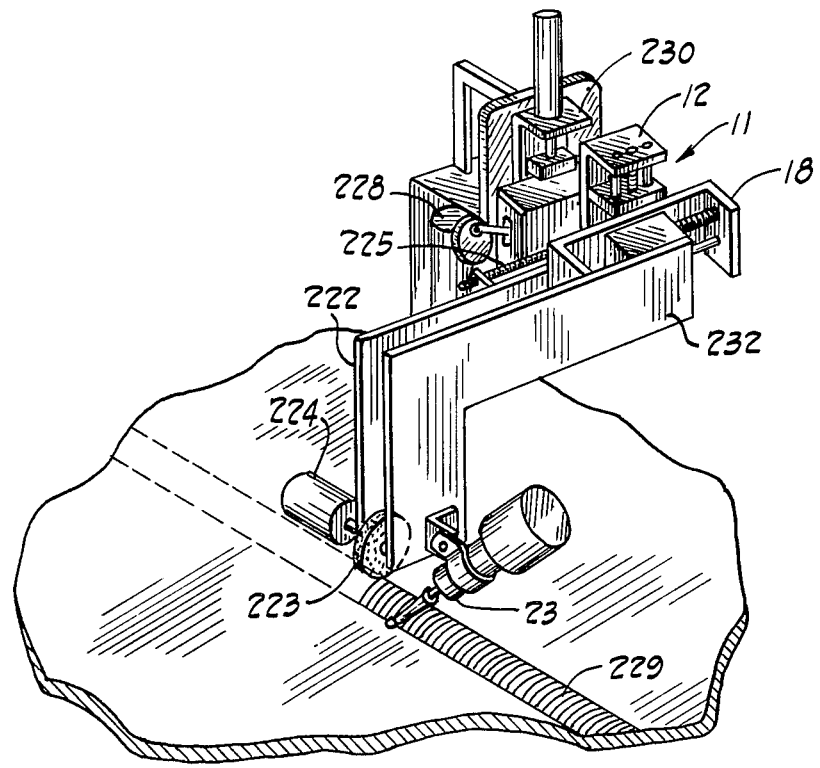

Still another apparatus embodying a preferred form of this invention is indicated generally at 220 in FIG. 8 where similar reference characters indicate similar parts as in FIG. 1.

In this instance, the apparatus 220 includes a fixed arm 222 supporting a tool disclosed as a grinding wheel 223 driven by motor 224. The arm 222 is supported on horizontal slide 225 and oscillates back and forth by the action of the motor driven oscillator 228 to move the grinding wheel 223 back and forth across a weld bead 229. The horizontal slide 225 and oscillator 228, are in turn supported on a vertical slide 230, which is air operated to maintain a downward pressure on the grinding wheel 223 to maintain an effective engagement with the weld bead 229.

The probe 23 is mounted on arm 232 and in turn is mounted on its separate cross slide assembly 11, also conveniently carried independently on the tractor frame ahead of the grinder slides 225 and 230. In this instance the probe 23 follows the previously made welding bead 229 and the grinder 223 grinds the joint flat. The probe 23 is shown only as controlling its own location and tractor steering and not as positioning the grinding wheel 223, per se, except as a function of the steering of the tractor.

Note, too, that the probe 23 in FIG. 1 is mounted on a hand operated slide 28 to adjust the spacial displacement between torch or tool 21 and probe 23. Also, the cross slide assembly 11 may be, and preferably is, mounted on pivot means 11a for rotation about a horizontal axis to allow tilting of the apparatus for fillet welding in addition to butt welding when the slide assembly 11 is vertical as shown.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance by which the invention has promoted the art.

We claim:

1. A self-propelled, free moving tractor or carriage adapted to carry a tool along a work path in a predetermined relative position therewith, said tractor comprising a base member, a plurality of wheel means supporting said base member for travel, drive means rotating at least one said wheel means for causing said tractor to travel, at least one said wheel means being mounted for rotation about an axis perpendicular to the axis of said driven wheel means for steering said tractor, motor means for rotating said steering wheel means about said perpendicular axis to steer said tractor, cross slide assembly means mounted on said tractor, said cross slide assembly means including a cross slide means mounted for movement in a direction transverse of said steering wheel axis, said cross slide means including reversible, motor driven screw means, and probe means carried on said screw means for movement therealong in response to rotation thereof, said probe means being adapted to follow a predetermined surface or abutment comprising a path, template, guide member or the like, and being responsive to changes or deviations in the direction of said surface or abutment transverse to said perpendicular axis to cause rotation of said screw means, said steering motor means being responsive to the responses of said probe to steer said tractor in a direction and to a distance substantially equal to each said change or deviation, respectively, in said surface or abutment.

2. The tractor according to claim 1 in which said probe displaces on said screw means in accordance with the deviations, respectively, in said surface or abutment and said steering motor means responds to the displacement of said probe on said screw means.

3. The tractor according to claim 2 in which said screw means and steering motor means turn in proportion to the magnitude of the deviation in the direction of said surface or abutment.

4. The tractor according to claim 3 in which said tool means is a cutting torch.

5. The tractor according to claim 3 with a plurality of single axis probe means carried thereby, one said single axis probe means sensing a said surface or abutment which is horizontal, another said single axis probe means sensing a surface or abutment which is vertical, said probe means being in horizontal, spaced relation with each other.

6. The tractor according to claim 3 in which said wheel means are positioned on said tractor to straddle said work path as said tractor travels therealong.

7. The tractor according to claim 3 in which said cross slide means extends horizontally.

8. The tractor according to claim 7 in which said tool means is supported on vertical slide means, said vertical slide means includes means pressing said tool means against said work path, means supporting said tool means for oscillatory motion transverse of said work path, and means to oscillate said tool means.

9. The tractor according to claim 8 in which said tool means is a motor driven grinding wheel means.

10. The tractor according to claim 7 in which said tool is a welding torch.

11. The tractor according to claim 10 in which said welding torch is carried by said horizontal screw means.

12. The tractor according to claim 11 in which said welding torch uses a welding current and said drive means is inoperative when said welding current is below a predetermined level.

13. The tractor according to claim 11 in which said surface or abutment is a welding seam and said probe and welding torch are maintained in functional relationship therewith.

14. The tractor according to claim 10 in which said probe has a predetermined, at rest null position on said horizontal screw means and said tractor steers to bias said probe toward and maintain it at said null position when said probe responds to deviations in said surface or abutment to be displaced from said null position.

15. The tractor according to claim 7 in which said cross slide assembly means includes a vertical cross slide means having a reversible motor driven screw means, and said horizontal cross slide means is mounted and supported on said vertical screw means.

16. The tractor according to claim 15 in which said probe is responsive to deviations in both the horizontal and vertical components of said surface or abutment.

17. The tractor according to claim 15 in which said vertical cross slide means is mounted on said tractor for rotation about a horizontal axis to tilt said probe and tool to reach into the juncture between vertical and horizontal walls or surfaces.

18. The tractor according to claim 15 in which said tool means is a motor driven grinding wheel means.

19. The tractor according to claim 16 in which said driven and steering wheel means are separate wheel means.

20. The tractor according to claim 19 with means for selectively, manually disconnecting said drive means from said wheel means driven thereby.

21. The tractor according to claim 1 with means interconnecting said probe means and steering motor means whereby said tractor has a steering radius proportional to the deviation in the direction of said surface or abutment as determined and sensed by said probe means.

22. The tractor according to claim 21 with electrical leads interconnecting said tractor and a power source.

23. The tractor according to claim 21 in which said means interconnecting said probe means and steering motor means is electrical potentiometer means producing signals representing the relative positions of the tool and the steering wheel means whereby correlation of the relative positions thereof results in the tractor following the movements of the probe means.

24. A self-propelled, free moving tractor adapted to carry a welding torch along a predetermined path relative to a work surface, said tractor comprising a base, a plurality of wheel means supporting said base, at least one said wheel means mounted for rotation for causing said tractor to travel along a path, variable drive means for rotating the at least one said wheel means, manually activated clutch means for engaging said variable drive means, at least one said wheel means is a steering wheel means, mounted for rotation about an axis perpendicular to the axis of said variable drive wheel means, for steering said tractor, proportional motor means for rotating said steering wheel means to steer said tractor, a first cross slide means mounted on said base for movement in a direction substantially transverse to the axis of rotation of said variable drive wheel means, a second cross slide means mounted on said first cross slide means for movement perpendicular to that of said first cross slide means and parallel with the axis of said variable drive wheel means, a welding torch suspended from said second cross slide means, probe means suspended from said second cross slide means and in a predeterminable spaced relationship to said welding torch, said first cross slide means including a reversible, proportional motor means for moving said second cross slide means relative thereto, said second cross slide means including a reversible, proportional motor means for moving said welding torch and probe means relative thereto, said second cross slide means including electrical potentiometer means producing electrical signals representing the relative position of said probe thereon, said probe means being adapted to follow a predetermined path on said work surface and responsive to deviations in the direction of the said predetermined path to cause rotation of the motor means of said first and second cross slide means, said steering wheel means including an electrical potentiometer means producing electrical signals representing the relative position of said steering wheel means, electrical circuit means responsive to the signals from the electrical potentiometer means of the second cross slide means and the steering wheel means to cause said tractor to steer, to correct and compensate for deviations, respectively, in the said predetermined path and maintain said probe means in a predetermined position on and in relation to said second cross slide means.

* * * * *